United States Patent [19]

Naratov et al.

[11] 3,988,077

[45] Oct. 26, 1976

[54] PNEUMATIC TIRE VULCANIZING APPARATUS

[76] Inventors: Alexei Mikhailovich Naratov, ulitsa Rabochaya, 8, kv. 94; Valery Leonidovich Legostaev, ulitsa Rabochaya, 8, kv. 44; Boris Sergeevich Gusev, ulitsa Sovetskaya, 161, kv. 83; Oleg Eduardovich Nadzharov, ulitsa Zhukovskogo, 1, kv. 78, all of Tambov; Valentin Ivanovich Osipov, ulitsa Ustinovicha, 34, kv. 16, Krasnoyarsk; Viktor Vasilievich Anisimov, ulitsa Juzhnaya, 52, Tambov; Enver Osmanovich Muratov, ulitsa Komsomolskaya, 121, Tambov; Ivan Ivanovich Tarasov, ulitsa Krasnoarmeiskaya, 7b, kv. 21, Tambov; Petr Fedorovich Badenkov, Prospekt Mira, 112, kv. 234, Moscow; Ljudvig Mikhailovich Kepersha, 2 ulitsa Sinichkina, 17, kv. 7, Moscow; Valentin Alexandrovich Ionov, Federativny prospekt, 34, korpus 2, kv. 45, Moscow; July Prokofievich Drozdov, shosse Frezer, 7/2 kv. 42, Moscow; Grigory Iosifovich Shvets, ulitsa Metallurgov, 12, korpus 1, kv. 14, Moscow; Ivan Ivanovich Kruglov, ulitsa Sovetskaya, 165, kv. 74, Tambov; Mikhail Dmitrievich Leontiev, ulitsa Sovetskaya, 180, kv. 1, Tambov, all of U.S.S.R.

[22] Filed: Mar. 4, 1975

[21] Appl. No.: 555,294

[52] U.S. Cl. ........................ 425/33; 425/34 R; 425/38; 425/47; 425/48; 425/58

[51] Int. Cl.² .................................. B29H 5/08
[58] Field of Search .............. 425/17, 18, 19, 20, 425/21, 22, 23, 24, 25, 26, 27, 28 R, 31, 32, 33, 34, 35, 36, 37, 38, 46, 47

[56] References Cited

UNITED STATES PATENTS

| 3,097,394 | 7/1963 | Mallory et al. | 425/33 |
|---|---|---|---|
| 3,137,032 | 6/1964 | MacMillan | 425/19 |
| 3,530,533 | 9/1970 | Turk et al. | 425/32 |
| 3,550,196 | 12/1970 | Gaguit | 425/34 |
| 3,584,335 | 6/1971 | Ulm et al. | 425/36 |
| 3,640,653 | 6/1970 | Laenen et al. | 425/33 |

FOREIGN PATENTS OR APPLICATIONS

| 859,607 | 1970 | Canada | 425/38 |
|---|---|---|---|
| 1,472,158 | 1967 | France | 425/32 |
| 802,014 | 1958 | United Kingdom | 425/38 |
| 257,737 | 1970 | U.S.S.R. | 425/38 |
| 306,022 | 1971 | U.S.S.R. | 425/38 |

*Primary Examiner*—J. Howard Flint, Jr.
*Attorney, Agent, or Firm*—Robert E. Burns; Emmanuel J. Lobato; Bruce L. Adams

[57] ABSTRACT

The apparatus is so constructed that the manipulator thereof, successively positionable over a series of tire vulcanizing presses, has mounted directly thereon a plunger that can be lowered vertically to push the bladder into the well in the bottom mold section of the press and to spread radially the segments clamping the bead of a cured tire. The same manipulator supports the rod of a mechanism for removing cured tires, movable vertically upward in opposition to the plunger.

Each bladder is provided at the center thereof with a ball valve closing off the hole for the plunger after the exit of the plunger therefrom, the latter being actuated by a rack-and-pinion transmission preventing rotation of the plunger.

6 Claims, 19 Drawing Figures

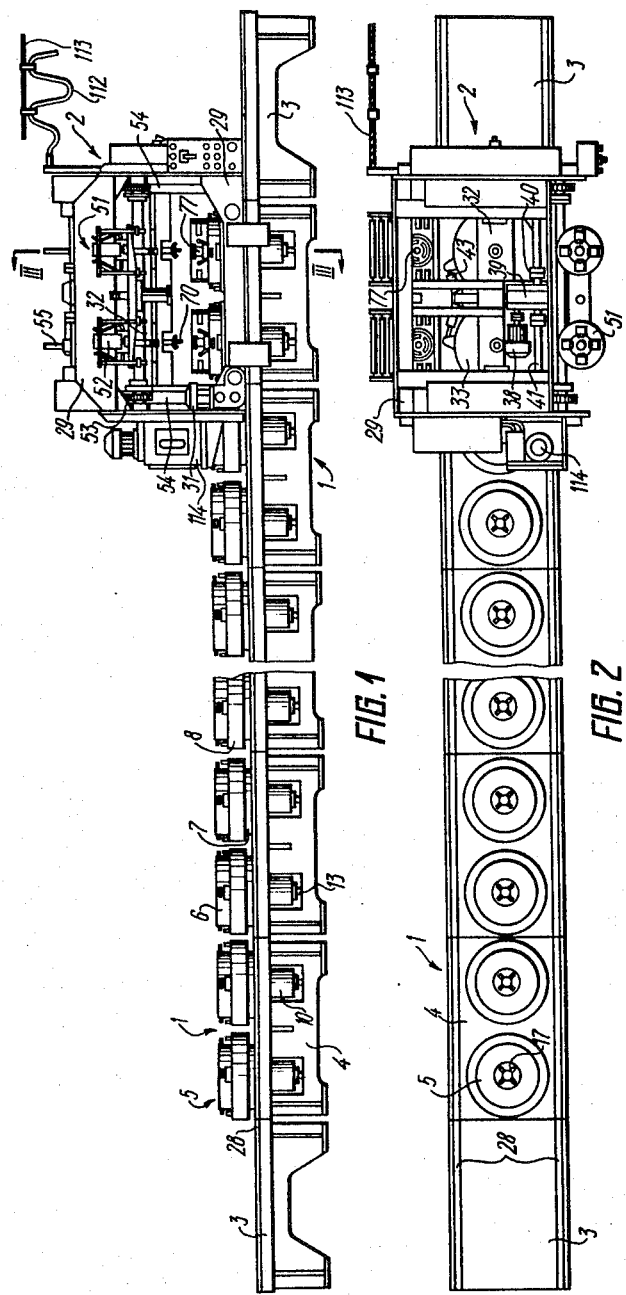

PNEUMATIC TIRE VULCANIZING APPARATUS

BACKGROUND OF THE INVENTION

The present invention relates to the field of production pneumatic tires and is intended for molding and vulcanizing of tires.

Known in the art is a pneumatic tire vulcanizing apparatus (see U.S. Pat. No. 3,550,196,) comprising a series of tire vulcanizing presses mounted in a longitudinal row, each press comprising a mold made up by a top mold section and a bottom mold section received in a steam dome, the mold being locked for a tire vulcanizing or curing period by means of either lever-type or screw-type mechanisms; a diaphragm or bladder withdrawable into the well of the bottom mold section; a plunger mounted on the top mold section and adapted to push the bladder from a cured tire into the well of the bottom mold section and cooperating with the arms of radially movable segments adapted to engage the top bead of the cured tire prior to unlocking of the top and bottom mold sections; a mechanism for removing cured tires from the top mold section, comprising a movable bead ring mounted in the top mold section and vertically reciprocable by means of an individual hydraulic cylinder, and a manipulator movable longitudinally of said row of the vulcanizing presses, carrying means for lifting, moving aside and lowering the top mold sections, as well as for loading green tires into the molds.

The above mentioned known penumatic tire vulcanizing apparatus is not free from a considerable disadvantage arising from the fact that pushing of the bladder from a cured tire into the well of the bottom mold and spreading of the radially movable segments of the means for clamping the top bead of a cured tire prior to removal thereof from the bottom mold section are performed with the help of a plunger (see U.S. Pat. No. 3,097,394,) mounted on the top mold section of the stationary vulcanizing press.

Since the pneumatic tire vulcanizing apparatus consists of a plurality of such stationary vulcanizing presses, and each such press incorporates the said plunger, and, consequently, the drive of this plunger and the control system associated with this drive, the structure of the tire vulcanizing apparatus, as a whole, becomes considerably complicated.

Besides, the plunger with its drive means and the mechanism for removing cured tires from the top mold sections are positioned in an elevated temperature zone heated up by the steam fed to heat the mold during the vulcanizing or curing operation, which affects the performance of the plunger and its drive and presents specific problems in selecting the material of the sealing means.

SUMMARY OF THE INVENTION

It is the main object of the present invention to provide a pneumatic tire vulcanizing apparatus, which should not require individual mechanisms for pushing the bladders from the cured tires into the respective wells of the bottom mold sections and individual mechanisms for unloading the cured tires from the top mold sections.

It is another object of the present invention to provide in the apparatus an independent mechanism for pushing the bladders from the cured tires into the wells of the respective mold sections, which should be operable with several tire vulcanizing presses.

It is still another object of the present invention to provide in a tire vulcanizing apparatus an independent mechanism for unloading the cured tires from the top mold sections, which should be operable with several tire vulcanizing presses.

It is yet another object of the present invention to improve the operating conditions of the actuating hydraulic cylinders of the abovementioned mechanisms and thus to prolong their service life.

These and other objects according to the present invention are attained by providing a pneumatic tire vulcanizing apparatus comprising a series of stationary vulcanizing presses mounted in a longitudinal row, each press has a tire mold consisting of a top mold section and a bottom mold section, locked together for a tire curing period. A bladder is mounted on the bottom mold section and is pushed by a plunger into a well made in the bottom mold section when the respective press is open. A mechanism is installed in the top mold section for clamping the top bead of the cured tire prior to removal thereof from the bottom mold section. A traveling manipulator is movable relative to the vulcanizing presses for opening and closing the molds of each vulcanizing press and loading green tires into them. The manipulator carries a plunger introduced successively into the molds of each of the vulcanizing presses through a central hole of the top mold section for pushing the bladder into the well of the bottom mold section and for actuating the mechanism for clamping the top bead of the cured tire. The manipulator carries a mechanism for separating the cured tire from the top mold section of each vulcanizing press and delivering the cured tire to a conveyor. Meanwhile in the center of the bladder of the vulcanizing press a valve is installed for closing the hole of the top mold section, after the plunger has been removed from the top mold section, for the period of the tire curing operation.

The abovementioned design feature disclosed in a general manner enables to do away with complicated and numerous mechanisms performing similar operations at each one of the presses and to attain a simplified and more reliably performing structure of the entire apparatus.

According to another embodiment of the present invention, the pneumatic tire vulcanizing apparatus is characterized in that a plunger end is provided with a cup-shaped cross-piece actuating the valve member to push the bladder into the well of the bottom mold section. The shape and size of the cross-piece is selected to ensure that this cross-piece passes freely between the respective arms of the mechainism for clamping the top bead of the cured tire.

This improvement is expedient to ensure an accurate engagement between the plunger and the bladder, a reliable centering of the bladder in the mold section and closing the mold for the tire curing period.

According to still another embodiment of the present invention, the pneumatic tire vulcanizing apparatus is characterized in that the plunger is provided with a sleeve with lugs, The sleeve actuates on each vulcanizing press a mechanism for clamping the top bead of the cured tire for removing the radially spreadable segments thereof from the socket-like counterbore of the top mold section.

This improvement enables to perform reliable clamping of the top bead of a cured tire by means of a mechanism that is considerably more simple and dependable that those employed for the same purpose in the hitherto known structures of the apparatus.

The above structure presents the most expedient way of making up the assembly for removing cured tires from the top mold sections, the assembly being the single such one in the apparatus and being cooperative with every press, just like the plunger described hereinabove.

And, finally, in accordance with the present invention, it is expedient that the tire vulcanizing apparatus should have the retaining means in the form of a finger having permanently urged thereagainst a catch pivotally mounted on the rod, the catch having a locking groove which the finger is adapted to enter for the retaining period, the catch carrying a follower engageable by an abutment of the frame of the manipulator, as the rod is being lowered, to rotate the catch and to release the finger and the bead of the tire being unloaded.

This improvement of the unit for retaining the carriage ensures reliable connection between the carriage and the hub, as a cured tire is being removed from the top mold section, as well as reliable interruption of this connection, as the rod is lowered into the initial position thereof.

According to an embodiment of the present invention, the pneumatic tire vulcanizing apparatus is characterized in that the valve member is a ball secured to the center of the bladder on its shank.

BRIEF DESCRIPTION OF THE DRAWINGS

Other advantages and characteristic features of the present invention will be made apparent in the following description of a preferred embodiment of the present invention, with reference being had to the accompanying set of drawings, wherein:

FIG. 1 is a general view of the herein disclosed apparatus for vulcanizing pneumatic tires;

FIG. 2 is a plan view of the apparatus shown in FIG. 1;

DESCRIPTION OF THE PREFERRED EMBODIMENTS

Referring now in particular to the appended drawings, the pneumatic tire vulcanizing apparatus includes a group of stationary tire vulcanizing or curing presses 1 (FIG. 1), mounted into a longitudinal row, a manipulator or crane 2 reciprocable along this row of the presses 1 and a pair of endmost tables 3 serving as stations for performing repairs and routine maintenance of the manipulator 2.

Figure 3:
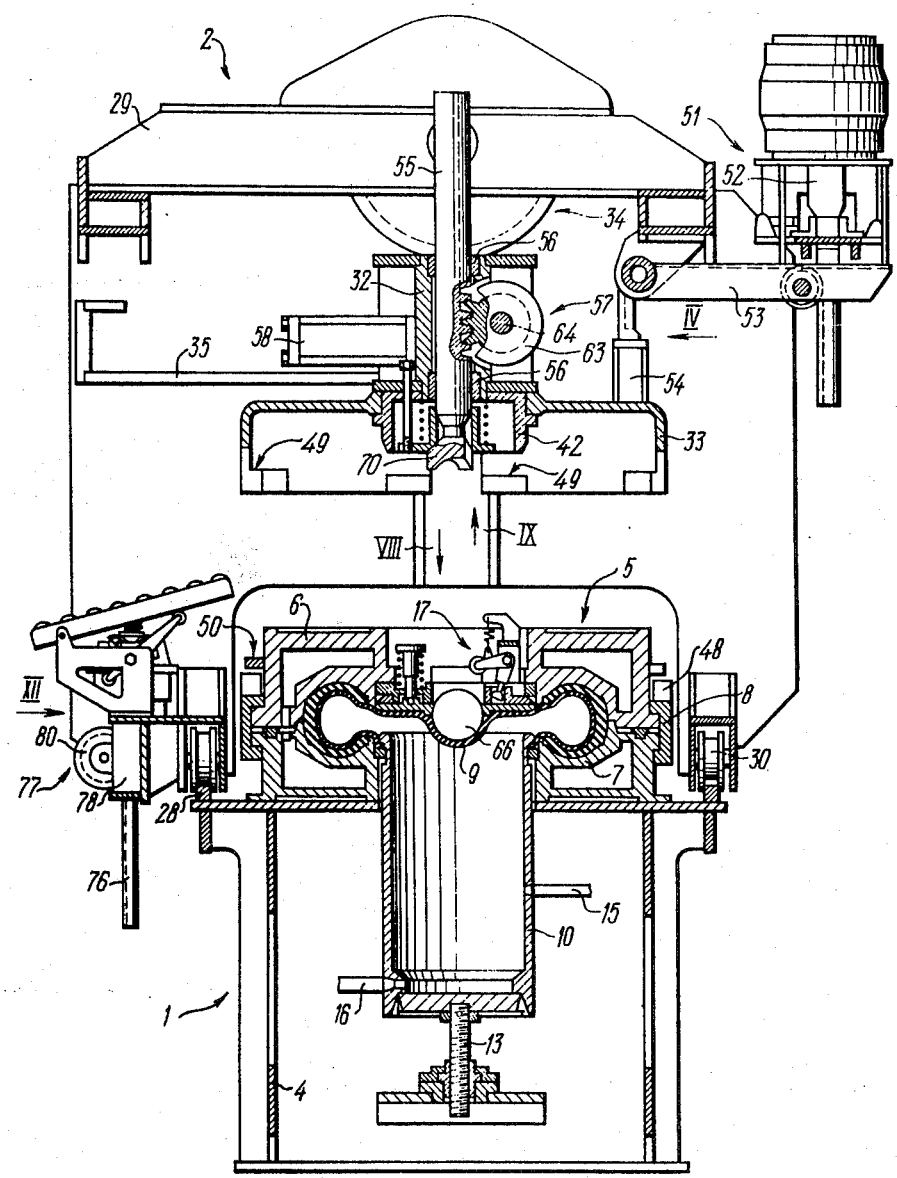
FIG. 3 is a sectional view taken on line III — III of FIG. 1.
Figure 10:
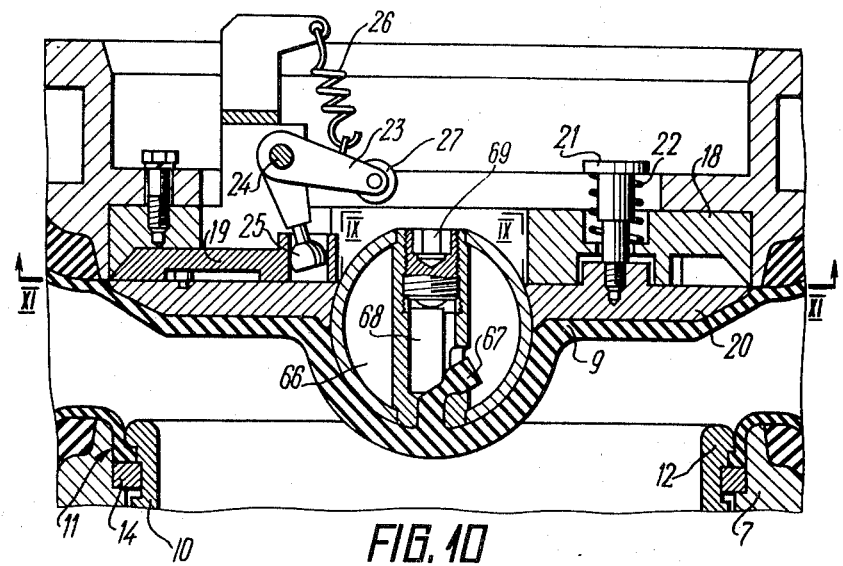
FIG. 10 is a sectional view taken on line X — X in FIG. 8.

Each vulcanizing press 1 consists of a table 4 supporting thereon a pair of mold assemblies or molds 5, each including a top mold section 6 and a bottom mold section 7 lockable together for a tire curing period with a bayonet lock 8. The bottom mold section 7 carries a bladder or diaphragm 9 (FIG. 3) and is provided with a well 10 into which this bladder 9 is withdrawn, when the press 1 is open. The bladder 9 is attached to the bottom mold section 7 by clamping the bead of the bladder 9 in the counterbore 11 (FIG. 10) of the bottom mold section by means of a shoulder 12 of the well 10 and a screw jack 13 (FIG. 3). The well 10 (FIG. 10) bears upon the bottom mold section 7 through a split ring 14 and is connected with a conduit 15 (FIG. 3) for supplying a heating agent into the internal space of the bladder 9 and an outlet conduit 16 through which the heating agent exits from the bladder 9.

The top mold section 6 has mounted therein a device 17 for clamping the top bead of a cured tire, prior to removing the latter from the bottom mold section 7.

The device 17 (FIG. 10) consists of a housing 18 fixedly secured in a socket-like counterbore of the top mold section and a plurality of spreadable segments 19 mounted on a base 20 movable relative to the housing 18.

The movable base 20 of the spreadable segments 19 is suspended from the housing 18 on pins 21 and is urged to the housing 18 by springs 22 tending to withdraw the spreadable segments 19 into the socket-like counterbore of the top mold section 6.

The segments 19 are spreadable with arms 23 mounted on axles 24 in the housing 18, each arm 23 having a spherical head 25 received in an opening made in the respective arm 19, the segments 19 being returned into their initial position by means of springs 26. The free ends of the arms 23 carry follower rollers 27.

The table 4 (FIG. 2) of each vulcanizing press 1 is provided with rails 28 forming together the track supporting the reciprocable manipulator 2.

The manipulator 2, as it rolls on the rails 28 from one vulcanizing press 1 to the successive one, effects reloading of their respective molds 5.

The manipulator 2 comprises a frame 29 (FIG. 3) with wheels 30 of which the leading ones are the driving wheels receiving motion from motorreducer assemblies 31 (FIG. 1).

The frame 29 (FIG. 3) carries a cross beam 32 with wrenches 33 for effecting rotation of the bayonet locks 8 of the molds 5, the cross beam being reciprocable by crank mechanisms 34 along guideways 35 of the frame 29 of the manipulator 2, to lift, carry aside and lower the top mold sections 6.

Each crank mechanisms 34 consist of a connecting rod 36 (FIG 17) and a crank wheel 37, the crank mechanisms being mounted at the lateral sides of the frame 29 (FIG. 4) and receiving their motion from an electric motor 38 through a reducing gear 39, clutches 40 and shafts 41.

The wrenches 33 (FIG. 3) are attached to the cross beam 32 by means of flanges 42 and are rotatable thereabout by hydraulic cylinders 43 (FIG. 4) to either unlock or lock the bayonet locks 8 (FIG. 3) of the molds 5.

The flanges 42 (FIG. 15) are secured to the cross beam 32 with bolts 44 and have shoulders 45 against which the wrenches 33 are arranged to bear, as well as cylindrical projections 46 for centering the wrenches 33 with respect to the molds 5.

The wrenches 33 (FIG. 4) have slots 47 adapted to receive, as the cross beam 32 is being lowered, the abutments 48 (FIG. 3) of the bayonet locks 8, as well as projections 49 which, at the end of the rotation of the wrenches 33, are positioned to underlie the ears 50 of the top mold sections 6. Thus, as the cross beam 32 is being raised, the top mold sections 6 rest on these projections 49.

The frame 29 of the manipulator also supports thereon a mechanism 51 for loading uncured or green tires into the bottom mold sections 7, the mechanism being known per se and including mechanical clamps 52 mounted on a pivotable bracket 52 actuated by a hydraulic cylinder 54, the frame 29 further supporting a mechanism for retaining the manipulator 2 in a required position relative to each successive stationary vulcanizing press in the row (the mechanism is not shown in the appended drawings, because it is of a commonly employed, known per se structure).

Figure 4:
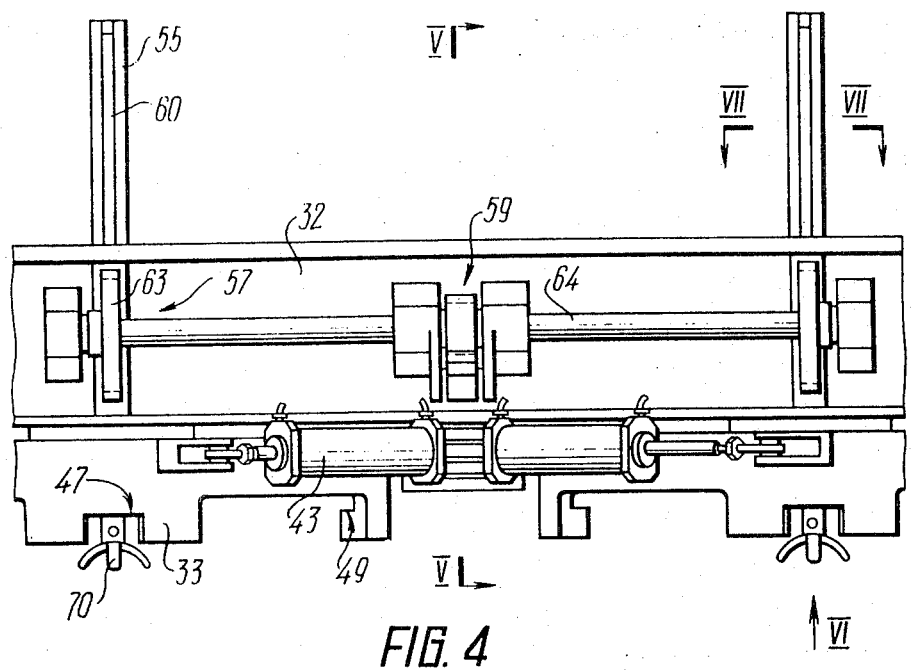
FIG. 4 is a view along arrow line IV in FIG. 3.

Directly on the movable manipulator 2 there is mounted a plunger 55 adapted to operate successively with each vulcanizing press in the row, to push the respective bladder 9 from a cured tire into the well 10 of the bottom mold 7 and to spread the segments 19 of the device 17 to clamp the top bead of the cured tire prior to removal thereof from the bottom mold section 7, at the moment of opening of the respective mold 5. In the presently described embodiment the manipulator 2 has two identical plungers 55 (FIG. 4).

Figure 5:
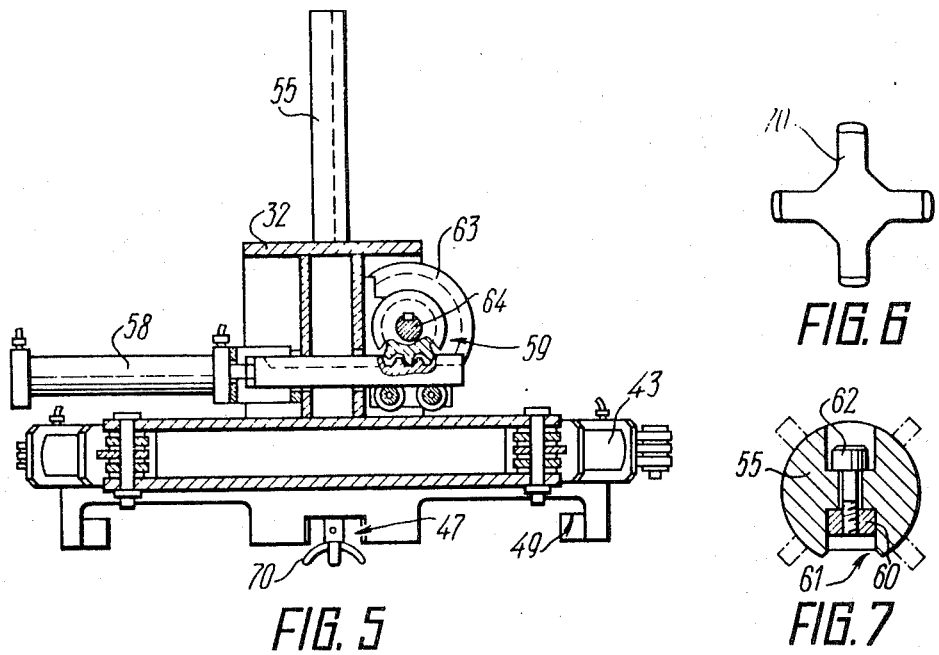
FIG. 5 is a sectional view taken on line V — V in FIG. 4.

The plungers 55 are mounted on a cross beam 32 (FIG. 3) of the manipulator 2 by means of sleeves 56 and are vertically reciprocable by rack-and-pinion transmissions 57 actuated from a hydraulic cylinder 58 (FIG. 5) through an intermediate rack-and-pinion drive 59.

Figure 7:
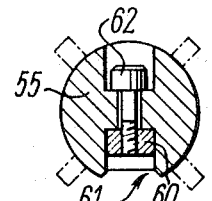
FIG. 7 is a sectional view taken on line VII — VII in FIG. 4.
Figure 8:
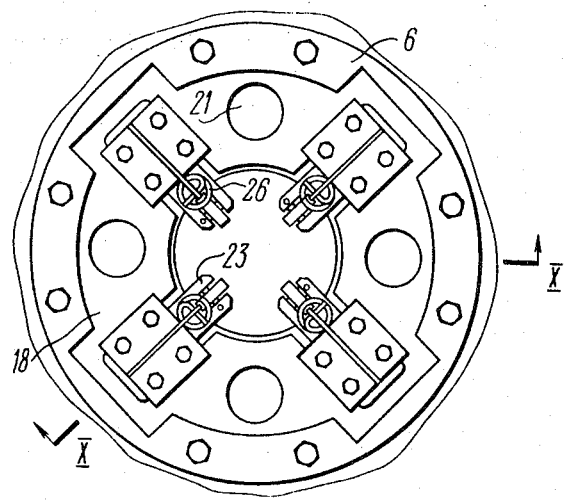
FIG. 8 is a view along arrow line VIII in FIG. 3.
Figure 9:
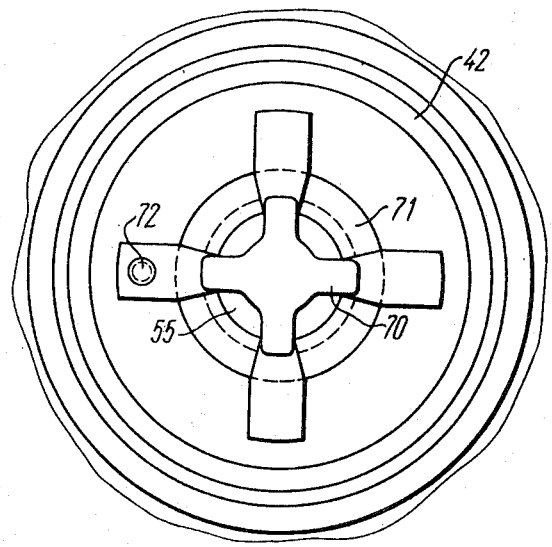
FIG. 9 is a view along arrow line IX in FIG. 3.

The rack 60 of the rack-and-pinion transmission 57 is received in a longitudinal slot 61 made in the plunger 55 (FIG. 7), below the cylindrical peripheral surface of this plunger, and is secured with bolts 62, while the pinion 63 (FIG. 4) of this transmission is mounted about a shaft 64 on the cross beam 32 and has its faces engaging the side walls of the longitudinal slot 61, thus precluding rotation of the plunger 55 about its longitudinal axis.

This structure feature of the herein disclosed apparatus further protects the bladder 9 from being harmed by the rack 60, as the bladder 9 is being pushed into the well 10.

Figure 16:
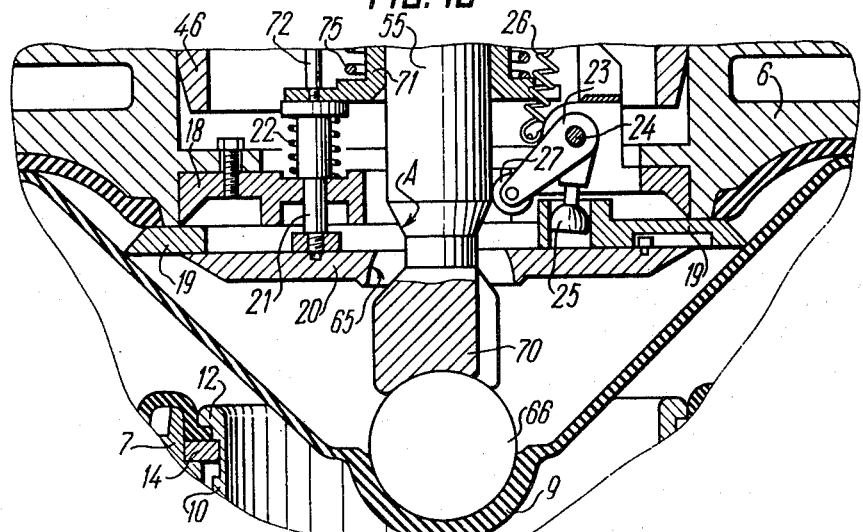
FIG. 16 shows the same, at the moment of clamping by the movable segments of the top bead of a cured tire.

To push the bladder 9 into the well 10 at each successive vulcanizing press 1, the plunger 55 passes into the mold 5 through a hole 65 (FIG. 16) made in the movable base 20 of the spreadable segments 19.

To close off this hole for a tire curing period, after the plunger 55 has cleared the top mold section 6, the bladder 9 is associated at the centre thereof with a valve member adapted to cooperate with the plunger 55, as the bladder 9 is being withdrawn into the well 10.

This valve member is made in the form of a sphere or ball 66 (FIG. 10) received about a lug 67 at the centre of the bladder 9 and secured to this lug with a clamping block 68 and a screw 69.

Figure 6:
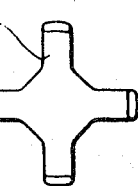
FIG. 6 is a view along arrow line VI on FIG. 4.

The plunger 55 (FIGS. 4 and 6) carries on the bottom end thereof a cross-piece 70 adapted to engage the ball 66 (FIG. 16) to push the bladder 9 into the well 10.

Figure 11:
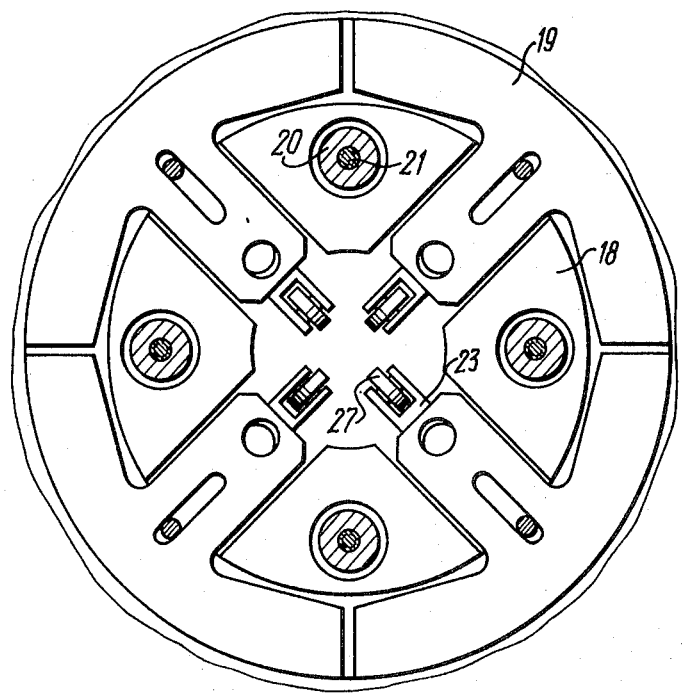
FIG. 11 is sectional view taken on line XI — XI in FIG. 10.

The cup-shaped cross-piece 70 offers a suitable ball-engaging surface and has a shape providing for unobstructed passage of the plunger 55 between the arms 23 (FIG. 11) of the radially spreadable segments 19.

The plunger 55 (FIG. 5) receives thereabout for cooperation with the cup-shaped cross-piece 70 thereof a sleeve 71 with ears of which one has secured thereto a guide 72 received in an opening 73 of the cross beam 32 of the manipulator 2 and having on the top end thereof an abutment head 74, the plunger 55 further receiving thereabout a spring 75 permanently urging the sleeve 71 downwardly.

The sleeve 71 with the spring 75 are intended to press the movable base 20 away from the housing 18 and thus to drive the spreadable segments 19 from the socket-like counterbore of the top mold section 6, the ears of the sleeve 71 engaging the pins 21 of the movable base 20, while the guide 72 ensures alignment of the ears of the sleeve 71 with these pins 21.

The plunger 55 has a conically reduced portion "A" which offers a cam surface to effect rotation of the arms (i.e. the bell cranks) 23 and thus to spread the segments 19 into their operating position in which the latter clamp the top bead of a cured tire prior to removing it from the bottom mold section 7.

The herein disclosed structure of the bladder assemblies of the stationary vulcanizing presses 1 (FIG. 3) and control of these assemblies with a single manipulator-supported mechanism in the form of two plungers 55 (FIG. 4) actuated by a single hydraulic cylinder 58 enables to curtail considerably the amount of actuating mechanisms associated with the bladders 9 (FIG. 3), and that with improving substantially the operating conditions of such actuating mechanisms and minimizing downtime caused by their mulfunctioning. The structure of the entire tire vulcanizing apparatus has thus become sizably simpler, the system of its automatic control-simplified, the amount of metal needed for its manufacture-reduced, and the cost of its maintenance and repairs — cut down.

The completeness of the solution of the problems put before the present invention is accomplished in the herein disclosed apparatus for vulcanizing pneumatic tires by the same manipulator also having mounted thereon the actuating vertical rod 76 of a mechanism 77 for removing cured tires from the top mold sections 6 of the respective successive vulcanizing presses 1, the removing operation being performed with the rod 76 moving upwardly in opposition to the working stroke of the plunger 55.

In the presently described embodiment the manipulator 2 supports this mechanism 77 (FIG. 12) for removing cured tires from the top mold sections 6 of the respective successive vulcanizing presses 1, the mechanism 77 including a pair of the abovementioned rods 76 mounted on a common frame 78 in guiding sleeves 79.

Figure 12:
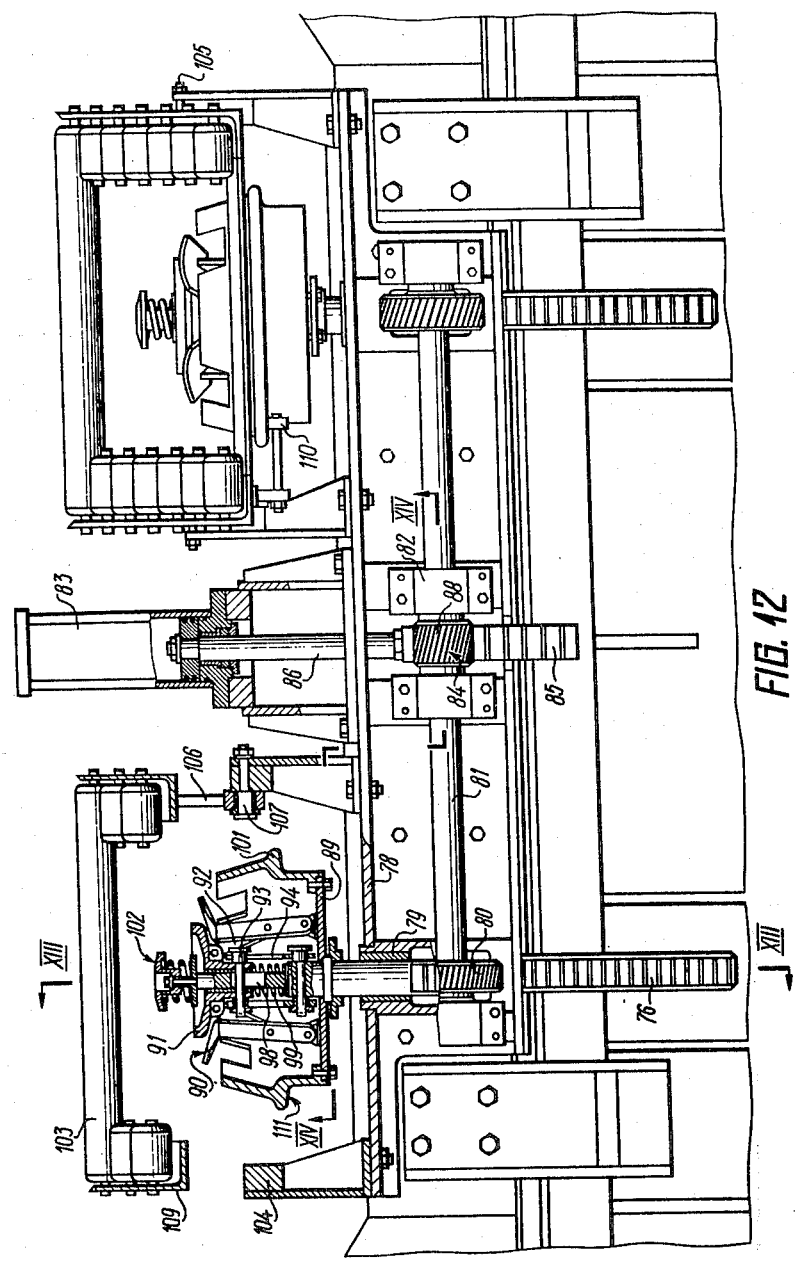
FIG. 12 is a view along arrow line XII in FIG. 3.
Figure 14:
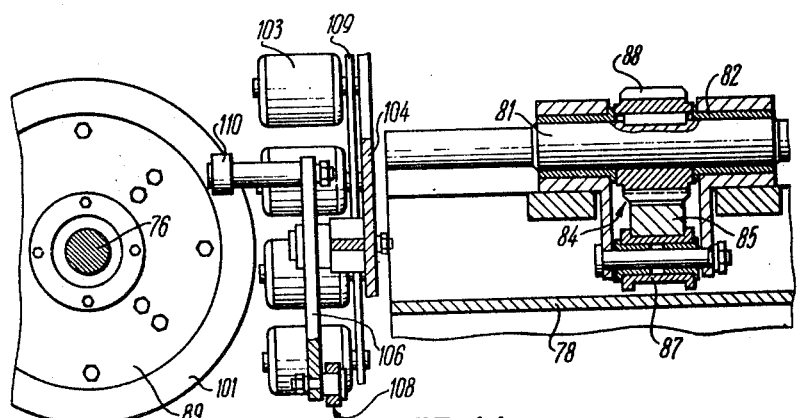
FIG. 14 is a sectional view taken on line XIV — XIV in FIG. 12.

The external surface of each rod 76 has cut therein teeth meshing with a pinion 80. The two pinions 80 are nonrotatably mounted about a common shaft 81 journalled in the frame 78 in bearings 82. The shaft 81 is rotatable from a hydraulic cylinder 83 through a rack-and-pinion transmission 84 of which the rack 85 is mounted on the piston rod 86 of the hydraulic cylinder 83 and bears upon supporting rollers 87 (FIG. 14), the pinion 88 being mounted about the same shaft 81 which carries the pinions 80 (FIG. 12).

Figure 13:
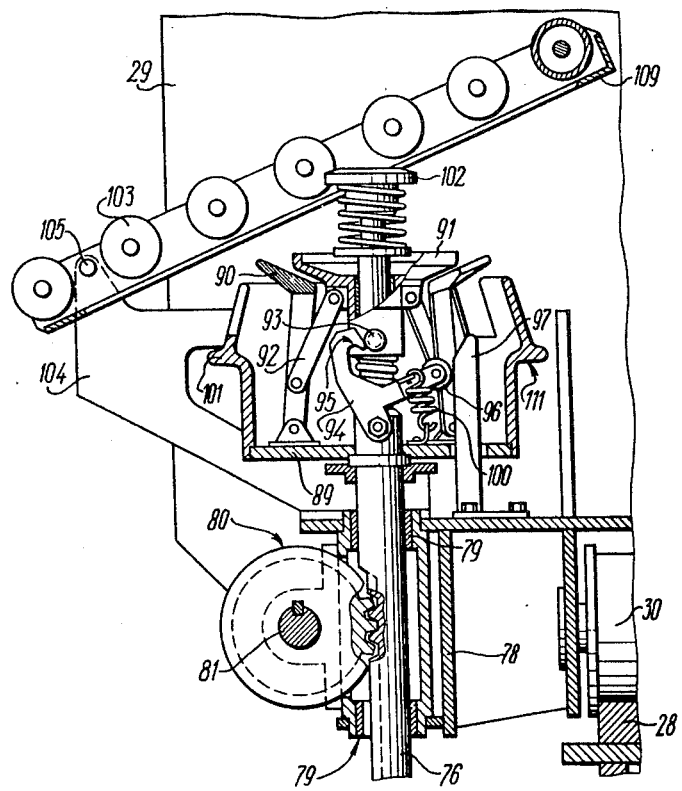
FIG. 13 is a sectional view taken on line XIII — XIII in FIG. 12.

The top end of the rod 76 carries a fixed hub 89 with clamps 90 adapted to engage the bottom bead of a cured tire, as well as a movable carriage 91 connected with the clamps 90 through links 92 (FIG. 13).

The rod 76 further carries means for retaining the carriage 91 relative to the hub 89 at the end of the operation of spreading the clamps 90 into their operative position, the retaining means including a finger 93 (FIG. 12) having permanently urged thereto a catch 94 (FIG. 13) pivotally mounted on the rod 76. The catch 94 has a locking groove 95 into which the finger 93 slides for the retaining period, the catch further carrying a follower 96 adapted to be engaged by an abutment 97 of the frame 29 of the manipulator 2, as the rod 76 is being lowered, to rotate the catch 94 and thus to release the finger 93 and the bead of the tire being removed.

The finger 93 (FIG. 12) is mounted on the movable carriage 91 and extends through a slot 98 provided in the rod 76. The slot 98 provides for reciprocation of the carriage 91 and prevents its rotation.

The carriage 91 is permanently urged upwardly by a spring 99, whereby the clamps 90 are held in a retracted position when the rod 76 is down.

The catch 94 is provided with a spring 100 (FIG. 13) which effects rotation of the catch 94 at the moment of retaining the carriage 91 relative to the hub 89.

The hub 89 carries a bead ring 101 (FIG. 12) on which a cured tire rests after having been removed from the top mold section 6. The upper portion of the bead ring 101 tapers to ensure centering of the tire about this ring 101, the height of the tapering portion being selected to ensure that the bead of the tire being removed from the ring 101 rides clear of the retracted clamps 90. It is expedient that the upper end of the rod 76 should carry a spring-urged abutment 102 which additionally ensures that the segments 19 of the device 17 are withdrawn positively, even should they have a tendency to jam for some reason. In this way the dependability of the performance of the device 17 is enhanced.

To unload a cured tire onto a delivery conveyor (not shown), the mechanism 77 for removing cured tires from the top mold sections 6 is associated with rollerways 103. The rollerways 103 are supported on the brackets 104 of the frame 78 for rotation about axles 105. Rotation of the rollerways 103 is effected with the help of arms 106. The arms 106 are mounted on the brackets 104 on axles 107 and carry on the ends thereof followers 108 (FIG. 14) adapted to engage the frames 109 of the rollerways 103 and followers 110 adapted to be engaged by the shoulders 111 (FIG. 13) of the bead rings 101, as the rod 76 is lowered toward its downmost position. The rotation of the rollerways 103 results in the cured tires being taken off the bead rings 101 (FIG. 15), whereafter the cured tires roll down by gravity along the inclined rollerways onto the delivery conveyor (not shown).

The herein disclosed structure of the mechanism for removal of cured tires, supported directly by the manipulator and operable in succession with every tire vulcanizing press of the apparatus, presents a complete solution of the problem that the present invention has to solve, simplifies to a great extent the overall structure of the pneumatic tire vulcanizing apparatus and promotes the economy of its operation.

Power supply to the manipulator 2 (FIGS. 1 and 2) is effected via a flexible cable 112 suspended from a supporting rope 113 along the row of the vulcanizing presses 1.

The actuating hydraulic cylinders of the manipulator 2 are supplied with pressurized oil from an oil pumping station 114 carried by the manipulator.

The operation of shaping and curing pneumatic tires is carried out by the herein disclosed pneumatic tire vulcanizing apparatus, as follows.

When the operation of curing green tires has been completed in the molds 5 (FIG. 1) of the first-in-succession vulcanizing press 1, the manipulator 2 is driven to these molds, arrested and retained in alignment therewith. The electric motor 38 is energized, and the cross beam 32 is driven downward by the crank mechanisms 3 (FIG. 17), the wrenches 33 thereof settling about the top mold sections 6, their slots 47 receiving the abutments 48 of the bayonet locks 8. As soon as the flanges 42 abut against the respective top mold sections 6 the cross beam 32 stops.

Figure 15:
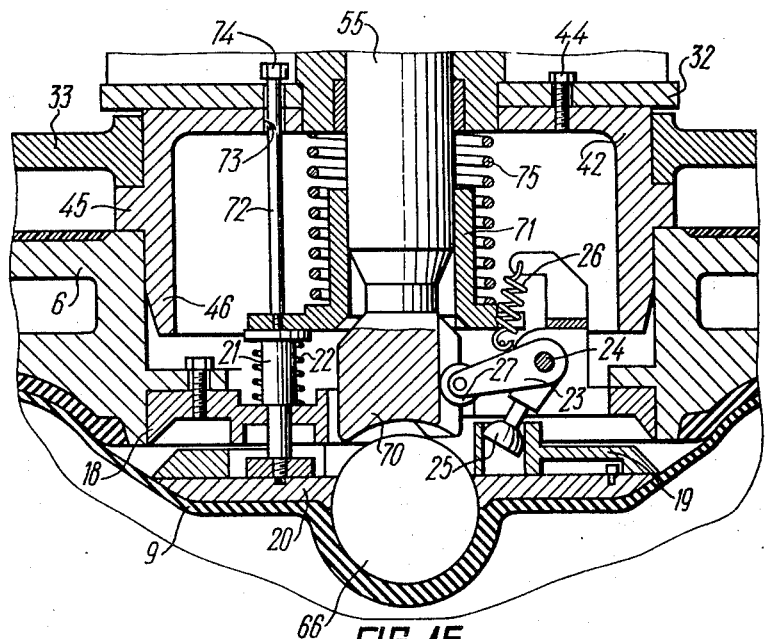
FIG. 15 illustrates the plunger with the sleeve, at the moment of urging of the movable base of the spreadable segments.
Figure 17:
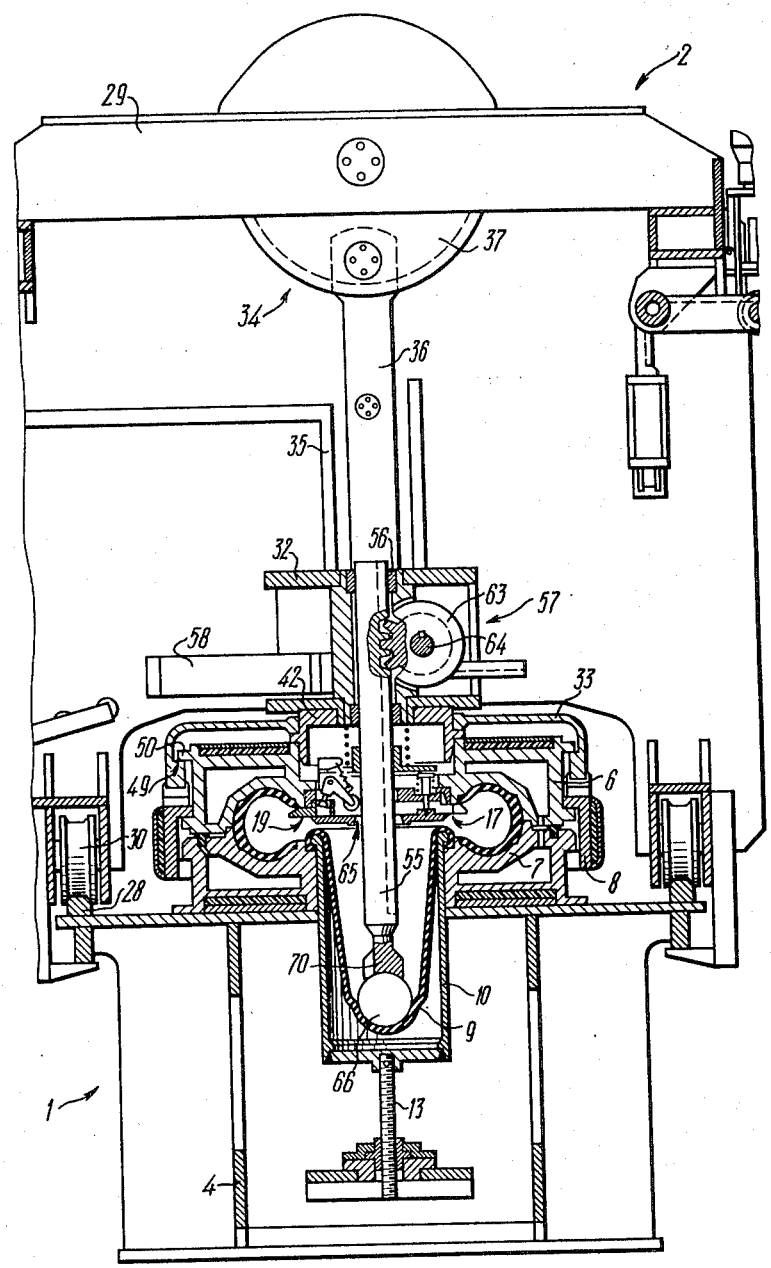
FIG. 17 is a view similar with that in FIG. 3, at the end of the operation of pushing the bladder into the well of the bottom mold section.

Then oil under pressure is applied from the pumping station 114 (FIG. 1) into the hydraulic cylinders 43 (FIG. 4) and hydraulic cylinder 58 (FIG. 17). The wrenches 33 are rotated to undo the bayonet locks 8 of the molds 5, their projections 49 aligning with the ears 50 of the top mold sections 6. Simultaneously, the plungers 55 are driven downward. The sleeves 71 (FIG. 15) bearing upon their cupshaped cross-pieces 70 lower therewith under the action of the springs 75. As the sleeve 75 is lowered, it presses by its ears upon the heads of the pins 21 and, overcoming the resistance of the springs 22, presses the movable base 20 away from the housing 18, thus propelling the spreadable segments 19 from the counterbore of the top mold section 6 inwardly into the mold 5 (FIG. 15).

As it lowers further, the plunger 55 (FIG. 16) abuts against the ball 66 of the bladder 9 and starts pushing the latter into the well 10 of the bottom mold section, the conically reduced section "A" of the plunger 55 engaging the follower rollers of the arms 23 and thus making the latter rotate.

As the arms 23 are thus rotated, their spherical heads 25 received in the openings of the segments 19 effect spreading of these segments. The skewed edges of the segments 19 separate the top bead of the cured tire from the bladder 9 and retain it against the bead ring of the top mold section 6.

After the bladders 9 have been pushed from the cured tires into the respective wells 10 (FIG. 17) of the bottom mold sections 7, and the bayonet locks 8 of the molds have been undone, the cross beam 32 is driven through its upward stroke, under the action of the crank mechanisms 34, the projections 49 of each wrench 33 thrusting from below at the ears 50 of the respective top mold section 6 and opening the mold 5, the cured tire, of which the top bead rests on the spreadable segments 19, being thus lifted from the bottom mold section 7.

The cross beam 32 is driven first vertically upward to lift the top mold sections with the cured tires supported on the spreadable segments 19 and then sideward into the tire unloading position. Simultaneously with the upward motion of the cross beam 32 the plungers 55 are driven likewise upward by the hydraulic cylinder 58, to rest in an intermediate position whereat their conically recessed sections A has not yet passed by the followers 27 (FIG. 16) of the arms 23.

Simultaneously with the sideward motion of the cross beam (FIG. 18) toward the unloading position the bracket 53 of the mechanism 51 for loading green tires into the bottom mold sections is rotated by the hydraulic cylinder 54, the clamps 52 of the mechanism 51 supporting thereon green tires dropped from the feed-in conveyor (not shown).

Upon the cross beam 32 having been driven into the cured tire unloading position the bracket 53 of the loading mechanism 51 positions the green tires in axial alignment with the bottom mold sections 7.

Figure 19:
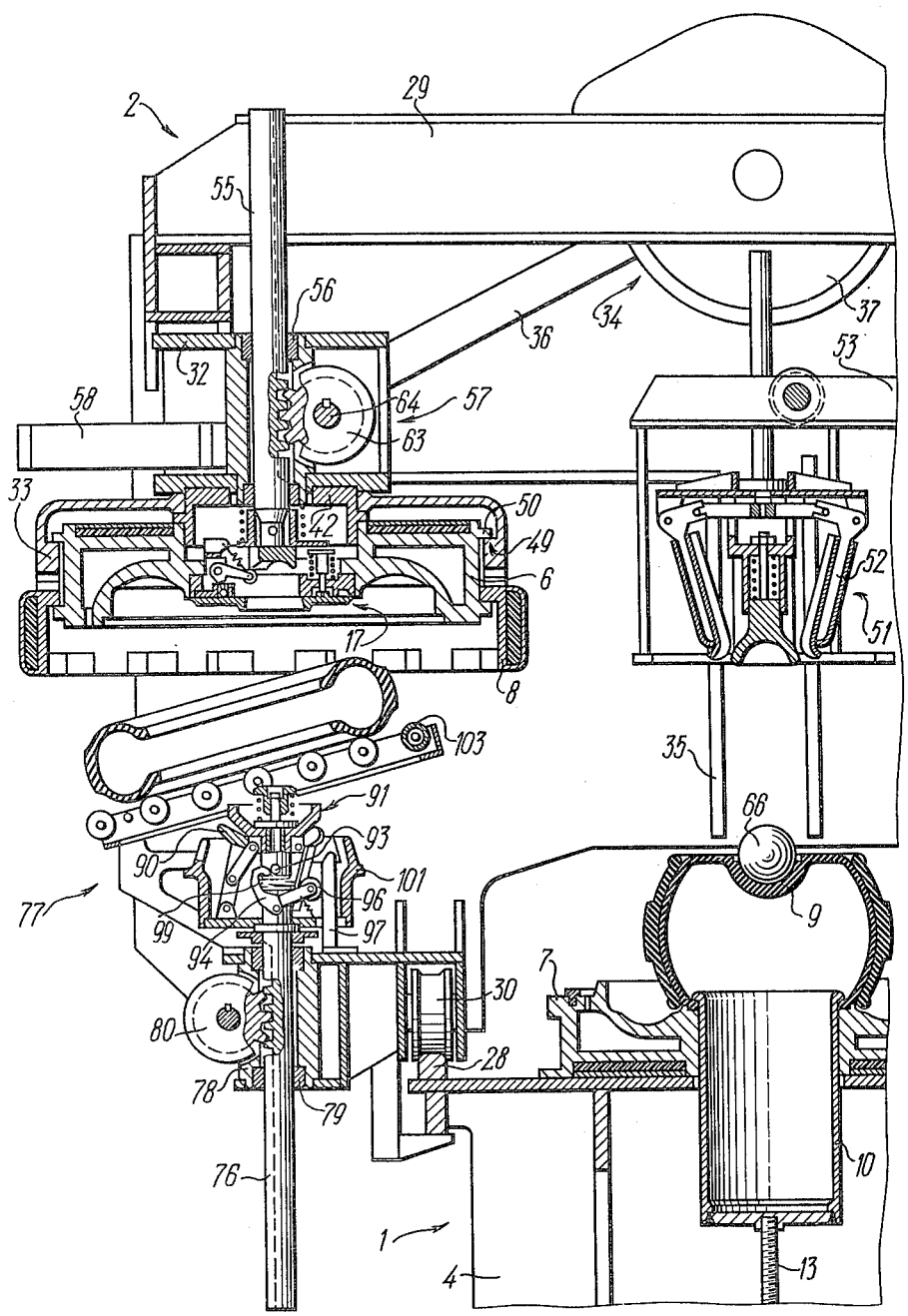
FIG. 19 is a view similar to that in FIG. 3, at the moment of returning into the initial position of the rod of the mechanism for removing a tire from the top mold section.

Now the mechanisms 51 effect loading of the green tires into the bottom mold sections 7. The green tires are lowered into the bottom mold sections and retained therein with the clamps 52. At the same time the bladders 9 are projected into the green tires by feeding steam under pressure into the wells 10. Under the action of the steam the bladders 9 leave the wells 10 and enter the interiors of the respective green tires, having previously expanded the latter. This done, the clamps 52 (FIG. 19) are brought together and lifted, and the mechanism 51 is returned into its initial position to receive fresh green tires from the feed-in conveyor (not shown), while there is maintained within the bladders 9 a pressure value retaining the green tires against the bead rings of the bottom mold section in an inflated state.

Figure 18:
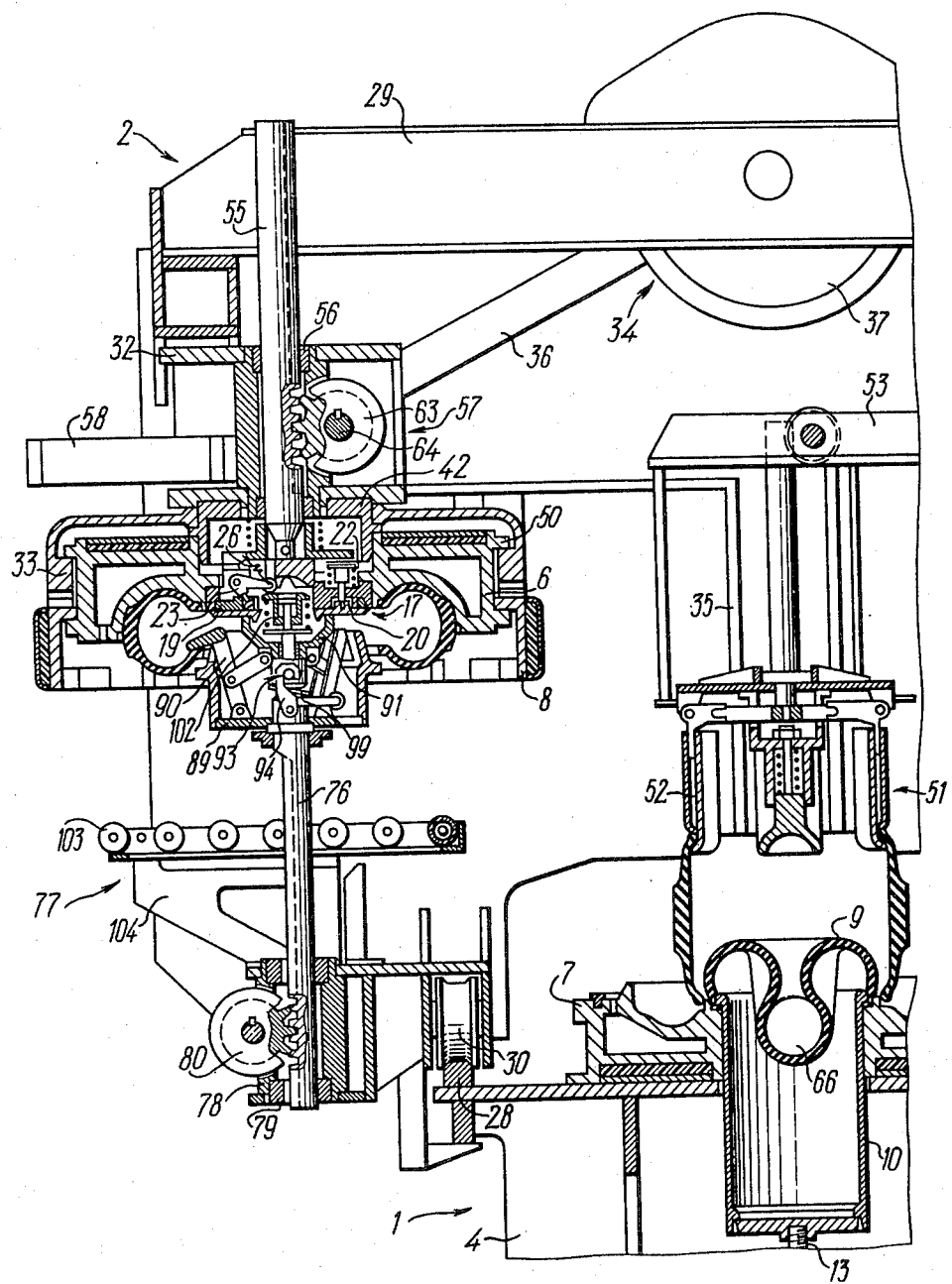
FIG. 18 is a view similar with that in FIG. 3, at the moment of retaining the operating position of the clamps of the mechanism for removing a tire from the top mold section.

Simultaneously with the operation of loading green tires into the bottom mold sections there is performed the operation of unloading the cured tires from the top mold sections 6 by the mechanism 77 (FIG. 18). The rods 76 of the mechanism 77 are driven upwardly by the hydraulic cylinder 83 (FIG. 12), and the bead rings 101 release the followers 110 of the arms 106, whereby the rollerways 103 (FIG. 18) are driven by gravity into a horizontal position whereat they rest upon the brackets 104.

At this moment the plungers 55 are lifted by the hydraulic cylinder 58 into their topmost position, whereby the arms 23 of the device 17 are released.

The springs 23 rotate the arms 23 to withdraw the segments 19 into their initial position, whereby the top beads of the cured tires are released, whereafter the movable bases 20 of the spreadable segments 19 are driven upward by the respective springs 22, and the segments are introduced into the counterbores of the top mold sections 6.

The rods 76 continue rising, the movable carriages 91 having their top ends abutting against the movable bases 20 of the movable segments 19 and thus stopping, while the hubs 89 together with the rods 76 continue their motion toward the movable segments, spreading the clamps 90 into the operative position. If for some reason up to this moment the segments have not been withdrawn into their initial compact position under the action of the springs 26, the spring-urged abutments 102 press upon the followers 27 of the arms 23 to rotate the arms and thus to withdraw the segments 19 into their compact position, in which way the top beads of the cured tires are positively released.

The rod 76 rises still higher, compressing the spring 99. When the clamps 90 are brought into their operative position, the catch 94 rotates under the action of the spring 100 (FIG. 13), its locking groove becoming axially aligned with the finger 93 of the carriage 91, the clamps 90 now having their ends overlying the bottom bead of the cured tire (FIG. 18).

Thereafter the rods 76 of the mechanism 77 are driven downward by the hydraulic cylinder 83. The fingers 93 (FIG. 13) find their way into the locking grooves 95 of the respective catches 94 and retain the clamps 90 in the spread position. The clamps 90 thrust with their ends on the bottom bead of the cured tire and thus remove the latter from the top mold section. The tire now rests on the bead ring 101. The rods 76 continue lowering. At the end of their downward stroke the followers 96 (FIG. 19) of the catches 94 engage the abutments 97 on the frame 29 of the manipulator 2.

Consequently, the catches 94 rotate and release the respective fingers 93 of the carriages 91, whereby the latter are lifted by the springs 99 and retract the clamps 90, the clamps 90 releasing the bottom beads of the cured tires.

At this moment the bead rings 101 engage the followers 110 (FIG. 14) of the arms 106, the latter thus rotating and lifting the rollerway 103 with their rollers 108. The rollerways 103 (FIG. 19) are thus driven through a pivoting motion, in the course of which they contact the cured tires and lift them clear of the respective bead rings 101. Upon the rods 76 returning into their lowermost position the cured tires roll down by gravity along the now inclined rollerways 103 and fall onto the delivery conveyor (not shown).

After the cured tires have been unloaded onto the delivery conveyor the cross beam 32 moves toward the position of closing the molds 5, the cross beam 32 moving downwardly along the guideways 35 of the manipulator 2. The top mold sections 6 engage the green tires resting in the respective bottom mold sections and start deforming them. Simultaneously shaping steam under specified pressure is fed into the bladders 9. At the end of the downward stroke of the cross beam 32 the top mold sections 6 close upon the bottom mold sections 7, and the cross beam 32 halts. The wrenches 33 are rotated to lock the bayonet locks 8 of the molds 5. Now there is commenced in the molds 5 of the vulcanizing press in question the operation of vulcanization of the green tires that had been loaded thereinto. The cross beam 32 is lifted into its initial position (FIG. 3), the manipulator 2 is released to move toward the next successive vulcanizing press 1, where the operations of re-loading of the respective molds 5 are performed in the abovedescribed sequence.

In this manner the manipulator 2 serves in succession every press 1 in the longitudinal row, whereafter it returns to the first-in-succession vulcanizing press 1 in the molds 5 of which the tire curing cycle has been already completed. Thereafter the abovedescribed operating cycle of the herein disclosed pneumatic tire vulcanizing apparatus repeats itself.

What we claim is:

1. A tire vulcanizing apparatus comprising, a plurality of stationary tire-vulcanizing presses installed in a row, each press having a tire mold having a top mold section having a central opening therein and a bottom mold section, each mold having locking means for releasably locking the top and bottom mold sections relative to each other during a tire-curing period, each press having a well below the bottom mold section for receiving therein a bladder when the tire mold is opened, each tire mold having a bladder secured to the bottom mold section thereof, each top mold section having a clamping mechanism for releasably clamping a top bead of a cured tire in the corresponding tire mold for transporting the cured tire with a corresponding top mold section for removal of the cured tire from the respective tire mold subsequent to curing thereof, a travelling manipulator having means for unloading the cured tires from the presses individually, successively and means for reloading each press with a green tire subsequent to unloading a cured tire therefrom, means comprising a plunger on said manipulator actuatable reciprocably and operable downwardly through the openings in the top mold section of each press to remove the corresponding bladder from a cured tire and introduce it into said well at the end of a curing period, means on said plunger for actuating the clamping mechanisms individually as said plunger travels downwardly through openings of the individual top mold sections thereby to clamp a cured tire to the corresponding top mold section, means on said manipulator for removing the top mold section of each of the tire molds successively, tire-removal means on said manipulator for separating each cured tire from a corresponding top mold section subsequent to removal of the top mold section from a press and means for delivering individually the cured tires to a position for removal therefrom, means on the manipulator for charging a green tire into a bottom mold section of a press after removal of the cured tire therefrom, means on the manipulator to restore the top mold section of a tire mold on to the bottom mold section thereof after charging of a green tire therein, valve means in each press for closing the opening of the corresponding top mold section in preparation for curing a green tire and for opening said opening upon completion of a selected curing period, and means on said manipulator for automatically opening said locking means prior to removal of each top mold section and automatically locking said locking means after each top mold section is restored to a corresponding tire mold.

2. A tire vulcanizing apparatus according to claim 1, in which said valve means comprises a ball-shaped valve mounted on a corresponding bladder.

3. A tire vulcanizing apparatus according to claim 2 in which said plunger comprises means on a leading end thereof for engaging said ball for introducing the corresponding bladder into the well thereof.

4. A tire vulcanizing apparatus according to claim 1, in which said clamping mechanism comprises a plurality of segments actuatable radially for clamping said tire bead, and clamping means on said segments actuated by said means actuating the clamping mechanisms.

5. A tire vulcanizing apparatus according to claim 1, in which said means for separating a cured tire from the top mold section comprises a rod actuated in strokes upwardly and downwardly in opposition to the direction of movement of said plunger, a hub on said rod having clamp means thereon actuatable for clamping a bottom bead of a cured tire, and means for actuating said clamp means to a clamping position 6. A tire vulcanizing apparatus according to claim 5, in which said means for separating a cured tire from a top mold section comprises means for actuating said clamp means to a released condition as said rod travels downwardly.

* * * * *